United States Patent [19]
Burnett et al.

[11] Patent Number: 4,749,390
[45] Date of Patent: Jun. 7, 1988

[54] FOUR-SIDED AIR FILTER

[75] Inventors: Gilbert W. Burnett; Paul D. Jackson, both of Rockwall, Tex.

[73] Assignee: Air Purification Products, International, Royse City, Tex.

[21] Appl. No.: 19,002

[22] Filed: Feb. 26, 1987

[51] Int. Cl.[4] .............................................. B01D 50/00
[52] U.S. Cl. ......................................... 55/316; 55/387;
55/481; 55/467; 55/486; 55/410; 55/512;
55/509; 55/DIG. 31
[58] Field of Search ................ 55/155, 279, 316, 387,
55/467, 473, 478–481, 484, 486, 487, 512, 527,
DIG. 31, DIG. 39, 410, 124, 126, 493, 504–507,
509

[56] References Cited
U.S. PATENT DOCUMENTS

| 4,115,082 | 9/1978 | Newell | 55/DIG. 31 |
| 4,252,547 | 2/1981 | Johnson | 55/234 |
| 4,504,290 | 3/1985 | Pontius | 55/316 |

Primary Examiner—Bernard Nozick
Attorney, Agent, or Firm—Jerry W. Mills; Alan W. Lintel

[57] ABSTRACT

A filtering unit (10) has four filter holders (20) arranged in a rectangle around a blower (36). Each filter holder holds up to two filter elements (11). The blower draws air through the filter elements (11) and outputs filtered air through a vent (40). Refillable filter frames (16) are provided to allow the user to change the filter material (18). In one embodiment, glass chips are used as the filter material (18).

13 Claims, 2 Drawing Sheets

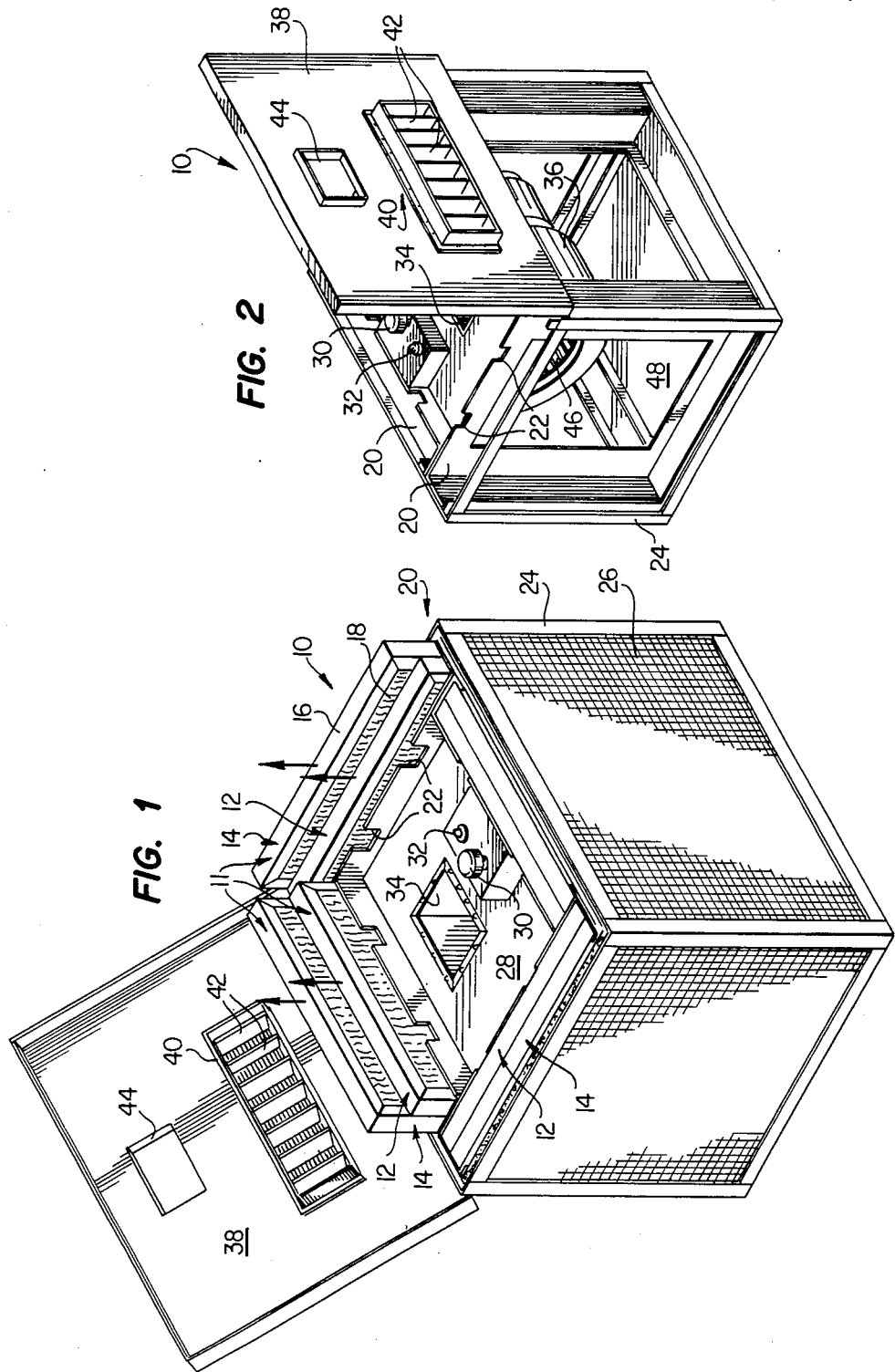

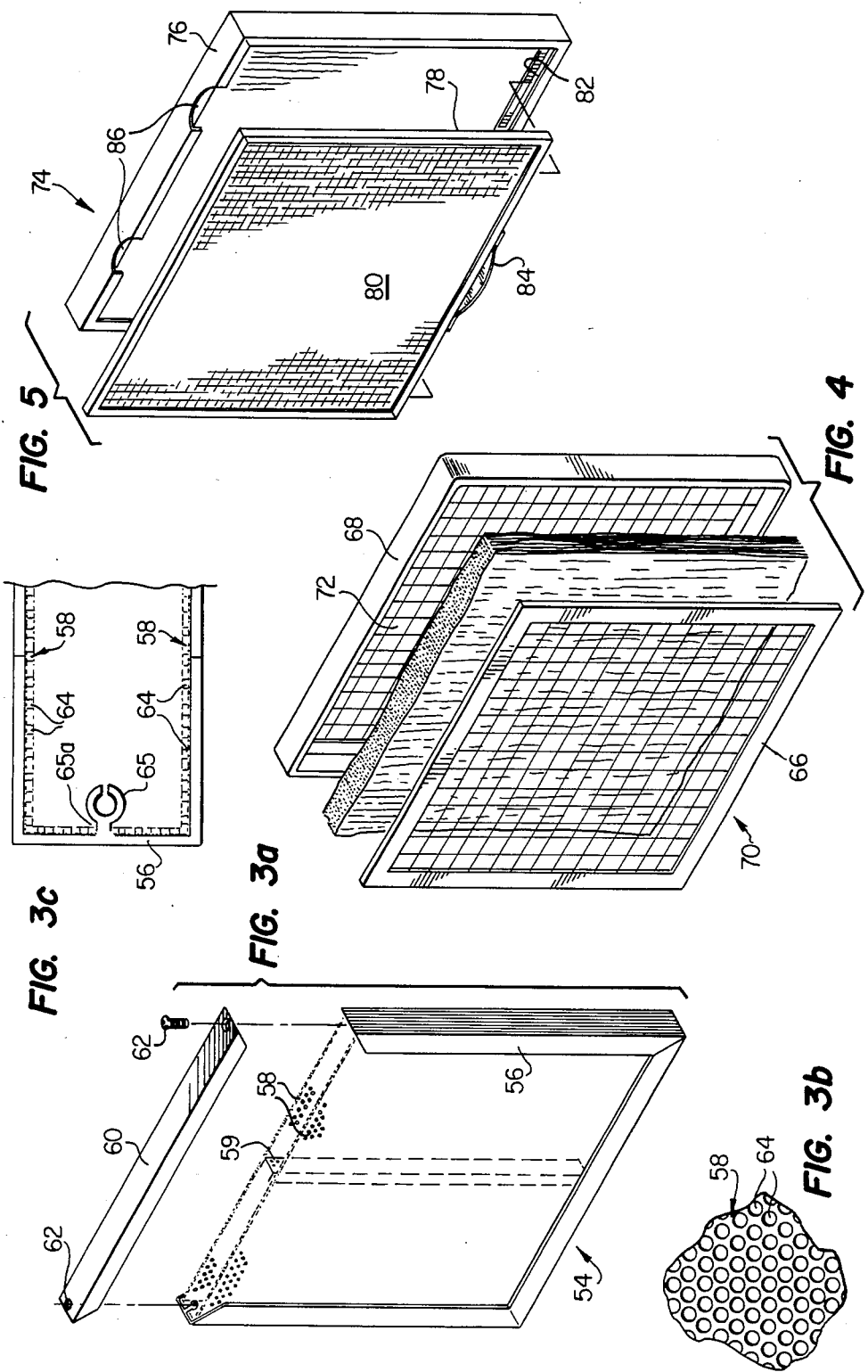

FOUR-SIDED AIR FILTER

TECHNICAL FIELD OF THE INVENTION

This invention relates in general to a method and apparatus of filtering air, and more particularly relates to a method and apparatus for efficient filtering of air in a variety of filtering applications using a compact filtering unit.

BACKGROUND OF THE INVENTION

In filtering air, it is desirable that the unfiltered air pass slowly through the filtering material in order to maximize the filtering effect of the material. However, it is also desirable that the air be filtered as quickly as possible, so as to minimize the time needed to filter the air in a given room. A solution to these conflicting goals is to provide a large surface area for the filtering material through which the unfiltered air travels.

In a conventional filtering unit, unfiltered air is drawn through the filtering material at one end and released out the opposite end. By increasing the surface area of the filtering material, the size of the filtering filtering unit, there is a trade-off between filtering effectiveness, processing speed, and the size of the unit.

Another problem associated with conventional filtering units is that the unfiltered air passes through only one filter element. Since many filtering applications involve more than one problem, such as dust and odor, it is desirable to provide two filtering elements, each designed to resolve a particular problem. Furthermore, it is desirable that the filters be interchangeable, thus allowing a single filtering unit to be easily configured for a variety of filtering applications. Previously developed systems have not adequately addressed this problem.

Because some filtering materials react unfavorably when combined with other filtering materials, it is impossible to place both filtering materials in a single filter element. However, it is often desirable to use two reactive filtering materials, such as potassium premangenate and charcoal, in a particular filtering application. Previously developed filtering units have not provided a solution to this problem.

From a user's standpoint, it is advantageous to use replaceable filter elements in a filtering unit, so that the filtering material used therein can be quickly and inexpensively changed by the user. In connection with granulated media, such as charcoal or potassium premangenate, previous developed filter frames have used tabs to secure a filter lid to the frame. The tabs, however, are prone to deterioration after frequent use, and are thus undesirable. Previously developed filter frames for fiber or pad filtering materials have proven to be unduly expensive.

Another serious problem associated with previously developed filtering units is the lack of a effective filter media for particulates which does not adversely affect "ecology" patients, those patients with a high sensitivity to chemicals. Ecology patients cannot use traditional filtering media such as fiber filters, since individual fibers will eventually "bleed off" and adversely affect the patients' allergenic condition.

Thus, a need has arisen for a filtering unit which provides effective filtering without increasing the size of the unit. Also, a need has arisen for a filtering unit which may be adapted for use in a variety of filtering applications, using filters specifically designed to resolve individual filtering problems. Furthermore, a need has arisen for filter frames which allow the user to quickly and inexpensively replace the filtering media therein. Finally, a need has arisen for a filtering media which is effective, but not detrimental to ecology patients.

SUMMARY OF THE INVENTION

In accordance with the present invention, a method and apparatus for filtering air through a plurality of filters is provided which substantially eliminates or prevents the disadvantages and problems associated with prior art air filters.

In accordance with another aspect of the invention, an apparatus for filtering air uses a plurality of filter holders for holding filter elements, with each filter holder operable to hold a plurality of filters. A blower having an intake for drawing air through the filter elements and an exhaust to output the filtered air is disposed within an enclosure formed by the filter holders. In the preferred embodiment, four filter holders form a box around the blower. Since the blower draws air through four filter faces, the velocity at which air is drawn through each filter element is slow in comparison with the speed at which the filtered air is output. By forming a box around the blower motor, a small filter surface area-to-volume ratio is achieved.

In another embodiment of the present invention, each filter holder holds two filter elements, such as a fiber filter element and a granulated filter element. The fiber filter element removes particles from the air, while the granulated filter element (such as glass chips, granulated charcoal, or granulated potassium permangenate) provides adsorption of chemicals. The filtering elements are interchangeably disposed within the filter holders in order to allow a single filtering unit to be used in a variety of filtering applications.

In yet another embodiment of the present invention, filter frames for holding filtering material are designed such that a user may provide filtering material for a specific purpose without reliance on manufacturer supplied filter elements.

In yet a further embodiment of the present invention, glass chips are used as a filtering media for ecology patients.

BRIEF DESCRIPTION OF THE DRAWINGS

For a more complete understanding of the present invention and the advantages thereof, reference is now made to the following description taken in conjunction with the accompanying drawings in which:

FIG. 1 is a perspective view illustrating an air filter unit having a plurality of filter elements;

FIG. 2 is a perspective view illustrating the air filter unit of FIG. 1 with the filter elements removed and the blower exposed;

FIGS. 3a-c are perspective views illustrating an-air filter element for holding a granulated filtering material;

FIG. 4 is a perspective view illustrating an air filter element for holding a fiber or pad filtering material; and FIG. 5 is a perspective view illustrating a washable air filter element for holding a charcoal pad or other pad filtering material.

DETAILED DESCRIPTION OF THE DRAWINGS

The preferred embodiment of the present invention is best understood by referring to FIGS. 1–5 of the drawings, like numerals being used for like and corresponding parts of the various drawings.

FIG. 1 illustrates a filtering unit 10 designed to provide effective and efficient air filtering in a portable self-contained unit. The filtering unit 10 utilizes up to eight filter elements (generally indicated by reference number 11), including four inner filters elements 12 and four outer filter elements 14. The filter elements 11 have a filter frame 16 enclosing a filter material (or media) 18. Each pair of inner and outer filter elements 12 and 14 are contained within a filter holder 20 comprising spaced apart metal walls. Thumb notches or holes 22 are provided on the interior of each filter holder 20 to allow access to the filter elements 12 and 14. Four filter holders 20 are connected so as to form a box enclosed by an outer frame 24. Grills 26 are removably disposed between the outer frame 24 and the interior walls of the filter holders 20.

A top panel 28 houses a speed control knob 30 and an on/off light 32. Knob 30 controls speed control circuitry which controls the operation of blower 36 (FIG. 2). The exhaust 34 of the blower 36 is disposed within the top panel 28. A lid 38 is hinged on the frame 24 such that it may be removed for access to the filter elements 12 and 14. The lid contains a vent 40 having movable louvers 42 which control the direction of the air output from the exhaust 34. A lid opening 44 provides access to the speed control 30 and the on/off light 32 through the lid 38.

Referring to FIG. 2, the filtering unit 10 is illustrated with the filter elements 12 and 14 removed so as to expose the inside of the filtering unit 10. The blower 36 is attached to the bottom of top panel 28. The blower is a squirrel cage which has opposed intakes 46 through which air is drawn. A bottom panel 48 completes the enclosure in which the blower 36 is contained.

In operation, the blower 36 draws air through the filter elements 11 disposed in the filter holders 20. The unfiltered air flows through the outer filter 14 first and then proceeds through the inner filter 12. As the air flows through each filter, an undesirable characteristic is removed. The filtered air enters the intake 46 of the blower 36 and exits through the exhaust 34.

In the preferred embodiment, each filter holder 20 holds two filter elements 12 and 14. The filter holder 20 is operable to hold either the inner filter 12 or the outer filter 14 independently, such that either filter element may be used in the absence of the other. If a single filter 12 or 14 is used in the filter holder 20, it will be held in place by the suction created by blower 36. Although the preferred embodiment provides for filter holders 20 containing two filter elements 12 and 14, alternative embodiments could be designed such that each filter holder 20 contained more than two filter elements.

In one embodiment of the present invention, each pair of filter elements 12 and 14 comprises a first filter element having a filter material 18 composed of a fibrous material and a second filter element having a filter material 18 composed of a granular material, such as granulated charcoal, glass chips or granulated potassium permangenate. The fiber filter material filters particulates from the incoming unfiltered air, while the granular filter material provides adsorption of chemicals and associated odors. Since the fiber filter material and granular filter material are contained in separate filter frames 16, different combinations of filtering materials may be easily provided for different filtering applications.

In an important aspect of the invention, two or more different filter materials may be used to filter undesirable characteristics from the air, even though the two filter materials would have an unfavorable reaction if used in closed proximity of each other. In this situation, the first filter material can be used in two opposite filter holders 20 and the second filter material can be used in the remaining filter holders 20. Air filtered through the first filter material will eventually recycle through the second filter material, and vice versa. This configuration provides the benefits of both filtering materials while avoiding undesirable reactions between the two filtering materials. It is recommended that this arrangement be used when both charcoal and potassium permangenate are used as filtering materials.

The grill 26 has a dual purpose. The first purpose of the grill is to protect the filter elements 12 and 14. The second function of the grill 26 is to provide a decorative feature to the filtering unit 10.

The speed control 30 allows the user to vary the rate at which air is filtered. The speed control 30 also provides an on/off function, and the status of the filtering unit 10 is indicated by the on/off light 32.

As noted, the blower 36 is preferably a, squirrel cage or "wheel-type" blower, which is more efficient and less noisy than a "propeller-type" blower. The blower is contained within the frame 24 to provide a self-contained, fully operational air filter. In the preferred embodiment, the blower 36 operates on either AC or DC voltage, to adapt the filtering unit 10 to a variety of environments. The DC operation allows the filtering unit 10 to be used in a motor vehicle to filter traffic fumes, often a serious problem to sensitive users.

The moveable louvers 42 allow the user to direct the flow of filtered air as desired.

In an important aspect of the invention, four filter holders 20, containing filter elements 12 and 14, surround the blower 36 to provide a large filter surface area relative to the volume of the filter unit 10. To produce a unit volume of filtered air, a one-quarter unit of unfiltered air must travel through each filter element 12 and 14. Hence, the air flow through each filter element is one-quarter as large as the flow through the exhaust 34. This provides for a relatively slow air flow through the filter elements 12 and 14, maximizing the effectiveness of the filter material 18, without sacrificing the overall rate at which air is filtered.

The box-like configuration of filter holders 20 around the blower 36 provides a large surface area in comparison with the volume of the filtering unit 10. Because of the high ratio of filter surface area to volume, the disclosed filtering unit 10 is much smaller in size than a conventional filter unit having the same filtering capabilities. The smaller size not only increases the unit's portability, but also allows the unit to be placed in areas which could not accommodate a larger conventional filter unit.

In the illustrated embodiment, the filter elements form a rectangular enclosure about the blower 36. As would be known to those skilled in the art, other configurations of filters about the blower 36 could be designed as squares, triangles, or other polygons in order to provide a suitable filter surface area-to-volume ratio. However, the rectangular configuration of the filters provides a compact unit, which is easily stored, and which provides suitable area for housing the blower 36.

The use of two filter elements 11 in each filter holder 20 allows the filtering unit 10 to be customized to a variety of applications by selecting a proper combination of filter materials 18 compatible with the specific application. Preferred filtration media arrangements for specific applications are given below.

In an embodiment used to filter dust from the air, the combination of an inner filter 12 using a foam pad and an outer filter 14 using a "Borosil" (a trademark of Dust Free, Inc.) fiber is recommended. The foam pad is preferably a one-quarter inch thick polyurethene foam pad. The Borosil material is a one-quarter inch deep material made of borosilicate glass fiber bonded with a phenolic resin. The foam pad is washable and is effective as a pre-filter for normal airborne contaminates. The Borosil is effective for control of pollen, mold spores, bacteria, smoke and dust. The Borosil is especially effective on particles having a diameter greater than 0.3 microns. If a light odor accompanies the dust, the preferred embodiment includes a inner filter 12 combining the Borosil material with a second layer of "Odor-Stat" material ("Odor-Stat" is a trademark of Dust Free, Inc.). The Odor-Stat material is a one-quarter inch black media made of polyester fiber impregnated with activated carbon. Odor-Stat is used to control dust and odor problems, and is particularly effective as a solution to remove smoke. Odor-Stat is a good general purpose odor and fume adsorbent for molecular weight gases common to industrial and urban environments. The Odor-Stat layer should be replaced at frequent intervals for maximum efficiency.

In an embodiment applicable to a situation combining dust and smoke, the foam pad and Borosil materials are used together in the outer filter 14, and the Odor-Stat is used in the inner filter 12 for maximum efficiency. If the smoke is heavy, the Odor-Stat used in the inner filter 12 is replaced with a granulated activated carbon material. In the preferred embodiment, the activated carbon is placed in a refillable one-inch thick panel, as illustrated in FIG. 3. The activated carbon is preferably made from coconut shells, and is useful where contaminate concentrations are above normal. The activated carbon controls odors of high molecular gases such as industrial pollution or hydrocarbons produced by traffic, and is also effective in adsorbing ozone and cigarette smoke.

In an embodiment of the air filter for use with respiratory care patients, a combination of foam pad and Borosil is used in the outer filter 14 and a "electrete" material is used in the inner filter 12. Electrete is a one-quarter inch deep material of spun-bond polypropylene fibers which have an electrostatic charge physically embedded into the surface area. No bonding agents are used in the material. Electrete was developed in Europe and used for respiratory masks, and for industrial and medical applications requiring high levels of air quality. The electrete material controls all the items that Borosil covers and is highly effective when used with Borosil as a pre-filter. It is considered safe for ecology and health care applications. For an allergy patient, the combination described above for use with respiratory care patients is used with an additional layer of Odor-Stat material combined with the electrete in the inner filter 12.

In a embodiment for controlling bacteria, a foam pad and Borosil combination is used in the outer filter 14 and a combination of Borosil and electrete is used in the inner filter 12.

For general control of industry odor, it is suggested that both the inner and outer filters 12 and 14 use activated carbon in a one-inch refillable panel. If the industrial odor is combined with high molecular gases, a inner panel of Borosil is effective.

In some industrial situations, it is preferable to use filters containing granulated potassium permanganate in the refillable one-inch thick panel. "Type Two" (or "Mark Two") potassium permanganate is effective to control hydrogen sulfide, ethylene, formaldehyde, methal, ethyl, mercaptans and chlorine. "Type Three" potassium permanganate is effective to control the odor ammonia and alkaline by-products. "Type Five" potassium permanganate is effective for chlorine, bromine, fluorine, iodine, and acid-based odors. If dust control is also a problem, Borosil may be used in place of the potassium permanganate in the inner filter 12.

For an embodiment in connection with ecology patients, those people with high chemical sensitivity, a glass-chip filter may be used in both inner and outer filter elements 12 and 14 for particulate control. The glass-chip filter uses washable glass chips in a one-inch thick holding tray. The glass-chip filter is effective for use where organic filtration media is required for dust, pollen, and mold and other particulates larger than 10 microns. If odor control is also needed in connection with an ecology patient, a combination of activated carbon and glass chips maybe used in both inner and outer filters 12 and 14.

In producing the glass chips, it is important that no oils or other odorous materials be used, since the odor could adversely affect the patient. A 4×6 mesh (0.185 inches by 0.131 inches) is used to size the glass chips.

Referring now to FIGS. 3-5, different embodiments of the filter frames 16 are illustrated. In FIG. 3a, a filter frame for holding a granulated media such as charcoal, glass chips, or potassium permanganate, is illustrated. The granulated media filter 54 has an aluminum frame 56 holding two perforated panels 58 spaced one-inch apart. A divider 59 aids in maintaining the distance between the perforated panels 58. A frame lid 60, shown in exploded view, is detachable from the remainder of the frame 56 to allow the area between the perforated panels 58 to be filled with a granulated media. Two screws 62 attach the frame lid 60 to the frame 56.

In FIG. 3b, the design of the perforated panel 58 is illustrated in greater detail. The perforated panel 58 is covered with tightly-spaced holes 64 such that air will be able to flow through the encased granulated media. The holes 64 are sized to allow maximum airflow through the panels 58 without allowing the filter material 18 from escaping through the holes 64. In the preferred embodiment, the holes 64 have a diameter of 70/1000 of an inch.

Referring now to FIG. 3c, the connection between the perforated panels 58 and the aluminum frame 56 is illustrated in detail. A screw boss 65 creates a channel 65a in which the edges of the perforated panel 58 are disposed. The channel 65a creates a tight fit, thus eliminating the need to spot weld the panels 58 to the frame 56. The screw boss 65 is also used for securing the frame lid 60 to the frame 56.

In operation, the granulated media filter 54 contains a granulated media such as charcoal, potassium permanganate, or glass chips. The granulated media filter 54 is filled by removing the screws 62 from the frame lid 60 and filling the cavity between the two perforated panels 58 with the desired granulated media. Thereafter, the lid 60 is replaced and the screws 62 tightened.

The design of the granulated media filter 54 allows a user to easily replace the granulated media with fresh media, or in the case of glass chips, recycled media. Furthermore, a user can change the media used in the granulated media filter, such that the same filtering unit 10 may be used in a variety of applications as needed.

In FIG. 4, a low-cost filter frame for housing fiber or pad filters is illustrated. The plastic frame 66 has a containing portion 68 and an enclosing portion 70. Both the containing portion 68 and the enclosing portion 70 have square holes 72 to allow air to flow therethough.

In operation, a user places a fiber or pad filter, such as the Borosil, electrete, Odor-Stat, or foam pad, into the containing portion 68 of the plastic frame 66. The enclosing portion 70 is placed onto the containing portion 68 and is pushed inwardly, forming a friction fit with the containing portion 68. The plastic frame 66 provides an effective, yet inexpensive, means of containing fiber or pad filters for use in the filtering unit 10. Furthermore, the friction fit allows the user to quickly and easily replace the filter media without a need for tools.

Referring now to FIG. 5, a washable filter for use with charcoal filters is illustrated. The washable filter 74 has a containing portion 76 and an enclosing portion 78. Both the containing portion 76 and the enclosing portion 78 have a washable filter 80. The enclosing portion 78 has a lip 82 along its outside edge. The enclosing portion 78 has a caging spring 84. Finger holes 86 are provided on the containing portion 76.

In operation, a charcoal pad, or other pad filter is enclosed between the containing portion 76 and the enclosing portion 78. To engage the enclosing portion 78 onto the containing portion 76, the caging spring 84 is positioned just inside the lip 82 of the containing portion 76. Slight pressure on the top of the enclosing portion 78 forces the caging spring 84 to compress, thus allowing the top of the enclosing portion 78 to slide under the lip 82 of the top of the containing portion 76.

To release the enclosing portion 78 from the containing portion, the user pushes down against the enclosing portion 78 through finger holes 86, thus compressing the caging spring 84. The top of the enclosing portion 78 is pulled outward and upward, thus removing the enclosing portion 78 to allow a filter change.

In the preferred embodiment, the washable filter 74 is an electrostatic polypropylene filter which developes a charge as air runs through the strands of the polypropylene. The electrostatic charge attract particles in the air, filtering the air as it runs through the mesh. The charcoal pad (or other pad) filter encased between the washable filter 74 provides additional filtering.

Although a preferred embodiment of the invention has been described in detail, it should be understood that various changes, substitutions, and alterations can be made therein without departing from the spirit and scope of the invention as defined by the appended claims.

What is claimed is:

1. Apparatus for filtering air comprising:
   a blower having an intake for drawing air and an exhaust for outputting air;
   a rectangular housing for enclosing said blower;
   four apertures formed in the sides of said housing;
   respective filter holders adjacent said apertures extending across said apertures;
   filter elements slideably engaged in said filter holders;
   said filter elements comprising a filter material for filtering unwanted particles from the air and a filter frame for replaceably holding said filter material; and
   said intake operable to draw air successively through said filter elements such that air filtered by filter elements is output from said exhaust such that unfiltered air may be drawn through said filtered elements slowly in relation to the exhaust speed.

2. The apparatus of claim 1 wherein a first filter element is operable to filter particulates from the air and a second filter element is operable to filter odors and chemicals from the air.

3. The apparatus of claim 1 wherein said blower is a wheel type blower.

4. The apparatus of claim 1 wherein said blower is adjustable over a plurality of speed settings.

5. The apparatus of claim 1 and further comprising means for directing the output air flow in a plurality of directions.

6. The apparatus of claim 1 wherein said blower operates on either AC or DC voltage.

7. The apparatus of claim 1 wherein ones of said filter holders hold a first filter element and other ones of said filter holders hold a second filter element, said second filter element having different filtering properties than said first filter element.

8. The apparatus of claim 7 wherein said first filter element contains charcoal and said second filter element contains potassium permanganate.

9. Apparatus for filtering air comprising:
   a blower having an intake for drawing air and an exhaust for outputting air, said blower operating at a plurality of speeds;
   a housing for enclosing said blower, said housing having four apertures formed therein, said apertures configured in a rectangle enclosing said blower;
   four filter holders through which air is drawn by said blower, each of said filter holder operable to hold filter elements across said apertures;
   said filter elements comprising a filter material for filtering unwanted particles from the air and a filter frame for enclosing said filter material, said filter frame allowing easy replacement of the filter material enclosed therein;
   said filter elements interchangeably disposed within said filter holding means, such that filter elements can be easily replaced within the filter holding means; and
   a hinge top portion having means for directing the airflow out of said exhaust and allowing access to said filter elements within said filter holders.

10. Filter apparatus for holding a granulated filtering material comprising:
   two perforated panels having opposite edge portions formed normal to the face of said panels;
   side members each having an integral screw boss disposed along the length of said side members forming channels for engaging said edge portions of said perforated panels, said side members holding said perforated panels a predetermined distance apart; and
   a top member removably engaged to said side members by screws extending into the bosses to allow a user to fill the cavity formed by the perforated panels with granulated filter material, said granulated material having particle sizes greater than the perforations in said panels, such that a filter element is formed to filter air passing through said perforated panels.

11. The apparatus of claim 10 and further comprising a divider disposed between said perforated panels to assist said side members in spacing said perforated panels by said predetermined distance.

12. The apparatus of claim 10 wherein said perforated panels have holes measuring approximately 70/1000 inches in diameter.

13. A washable filter comprising:

two washable electrostatic polyprophylene filter panels;

a first frame holding one of said washable filter panels, said first frame having a leaf spring a second frame holding the other of said washable filter panels, said second frame having side members containing a charcoal filter material and a rim disposed about said side members; and said first frame operable to enclose said filter material within said second frame, such that said first frame fits within said rim only when said leaf spring is in a compressed position.

* * * * *